(12) United States Patent
Rajagopalan et al.

(10) Patent No.: US 10,477,385 B2
(45) Date of Patent: Nov. 12, 2019

(54) METHODS, SYSTEMS AND COMPUTER READABLE MEDIA FOR DISTRIBUTING POLICY RULES TO THE MOBILE EDGE

(71) Applicant: Tekelec, Inc., Morrisville, NC (US)

(72) Inventors: Sundaram Rajagopalan, Waltham, MA (US); Ajay Padmakar Deo, Carrollton, TX (US); Uri Baniel, Buffalo Grove, IL (US)

(73) Assignee: TEKELEC, INC., Morrisville, NC (US)

( * ) Notice: Subject to any disclaimer, the term of this patent is extended or adjusted under 35 U.S.C. 154(b) by 0 days.

(21) Appl. No.: 13/947,314

(22) Filed: Jul. 22, 2013

(65) Prior Publication Data
US 2014/0031029 A1    Jan. 30, 2014

Related U.S. Application Data

(60) Provisional application No. 61/674,270, filed on Jul. 20, 2012.

(51) Int. Cl.
*H04W 8/22* (2009.01)
*H04W 48/06* (2009.01)
(Continued)

(52) U.S. Cl.
CPC ............ *H04W 8/22* (2013.01); *H04W 48/06* (2013.01); *H04W 8/245* (2013.01); *H04W 48/08* (2013.01)

(58) Field of Classification Search
CPC ....... H04W 8/22; H04W 48/06; H04W 48/08; H04W 8/245; H04W 40/20; H04W 4/043;
(Continued)

(56) References Cited

U.S. PATENT DOCUMENTS 5,901,352 A    5/1999  St-Pierre et al.
6,144,636 A   11/2000  Aimoto et al.
(Continued)

FOREIGN PATENT DOCUMENTS

CA    2730103    2/2019
CN    1889499 A  1/2007
(Continued)

OTHER PUBLICATIONS

Final Office Action for U.S. Appl. No. 13/572,132 (dated Mar. 11, 2015).

(Continued)

*Primary Examiner* — Matthew C Sams
(74) *Attorney, Agent, or Firm* — Jenkins, Wilson, Taylor & Hunt, P.A.

(57) ABSTRACT

Methods, systems, and computer readable media for distributing policy rules from a data content network to user equipment in a mobile network are disclosed. In one example, the method includes obtaining, by a mobile offload gateway (MOG) located in a core data content network, at least one mobile policy rule associated with a mobile subscriber. The method further includes transmitting, from the MOG, the at least one mobile policy rule to a user equipment (UE) located outside of the core data content network, wherein the UE is associated with the mobile subscriber and configuring the UE to function in accordance to the at least one mobile policy rule.

17 Claims, 3 Drawing Sheets

(51) Int. Cl.
 *H04W 8/24* (2009.01)
 *H04W 48/08* (2009.01)
(58) Field of Classification Search
 CPC ... H04W 4/90; H04W 72/1257; H04W 76/10;
  H04W 24/00; H04W 8/20; H04L
  65/1069; H04L 12/1485; H04L 12/5692;
  H04L 41/0893; H04L 41/147; H04L
  41/5067; H04L 47/70; H04L 47/822;
  H04L 47/823; H04L 65/1016; H04L
  67/1095; H04L 67/22; H04L 67/306;
  H04L 69/16; H04M 2203/2072; H04M
  3/436; H04M 15/63; H04M 15/66
 USPC ............... 715/738; 455/405, 406, 407, 517;
  705/30, 400, 403; 725/1
 See application file for complete search history.

(56) References Cited

U.S. PATENT DOCUMENTS

| | | |
|---|---|---|
| 6,661,780 B2 | 12/2003 | Li |
| 6,880,005 B1 | 4/2005 | Bell et al. |
| 7,072,651 B2 | 7/2006 | Jiang et al. |
| 8,089,942 B2 | 1/2012 | Cai et al. |
| 8,305,922 B2 | 11/2012 | Cuervo |
| 8,326,263 B2 | 12/2012 | Zhou et al. |
| 8,331,229 B1 | 12/2012 | Hu et al. |
| 8,335,220 B2 | 12/2012 | Hu et al. |
| 8,353,000 B2 | 1/2013 | He et al. |
| 8,400,916 B2 | 3/2013 | Cutler et al. |
| 8,406,137 B2 | 3/2013 | Siddam et al. |
| 8,433,794 B2 | 4/2013 | Baniel et al. |
| 8,438,290 B2 | 5/2013 | Rui et al. |
| 8,458,767 B2 * | 6/2013 | Riley ............... H04L 41/5058 726/1 |
| 8,543,118 B1 | 9/2013 | Mangal et al. |
| 8,577,329 B2 | 11/2013 | Momtahan et al. |
| 8,595,368 B2 | 11/2013 | Baniel et al. |
| 8,601,073 B2 | 12/2013 | Craig et al. |
| 8,605,583 B2 | 12/2013 | Cutler et al. |
| 8,626,156 B2 | 1/2014 | Marsico |
| 8,630,925 B2 | 1/2014 | Bystrom et al. |
| 8,675,487 B2 | 3/2014 | Siddam et al. |
| 8,681,622 B2 | 3/2014 | Chatterjee et al. |
| 8,787,174 B2 | 7/2014 | Riley et al. |
| 8,824,315 B2 * | 9/2014 | Kokkinen ........... H04W 24/00 370/252 |
| 8,902,854 B2 | 12/2014 | McCann et al. |
| 8,983,506 B2 * | 3/2015 | Silver ................ H04W 76/10 455/461 |
| 9,021,072 B2 | 4/2015 | Atreya et al. |
| 9,106,769 B2 | 8/2015 | Kanode et al. |
| 9,154,998 B2 | 10/2015 | Zhu et al. |
| 9,166,803 B2 | 10/2015 | Riley et al. |
| 9,185,510 B2 | 11/2015 | Nas |
| 9,215,728 B2 * | 12/2015 | Silver ................ H04W 76/10 |
| 9,225,849 B2 | 12/2015 | Jackson et al. |
| 9,369,910 B2 | 6/2016 | Rajagopalan et al. |
| 9,413,884 B2 * | 8/2016 | Silver ................ H04W 76/10 |
| 9,537,775 B2 | 1/2017 | McMurry et al. |
| 9,699,045 B2 | 7/2017 | Roach et al. |
| 9,743,928 B2 | 8/2017 | Shelton, IV et al. |
| 9,860,390 B2 | 1/2018 | Terrien et al. |
| 9,917,700 B2 | 3/2018 | Riley et al. |
| 10,027,760 B2 | 7/2018 | Renzullo et al. |
| 10,225,762 B2 | 3/2019 | Juneja |
| 2003/0003928 A1 | 1/2003 | Marjelund et al. |
| 2003/0092444 A1 | 5/2003 | Sengodan et al. |
| 2004/0116117 A1 | 6/2004 | Ahvonen et al. |
| 2005/0013423 A1 * | 1/2005 | Eversen ............... H04M 15/00 379/114.17 |
| 2005/0064889 A1 | 3/2005 | Haumont |
| 2005/0107091 A1 | 5/2005 | Vannithamby et al. |
| 2005/0176438 A1 | 8/2005 | Li |
| 2006/0013191 A1 | 1/2006 | Kavanagh |
| 2007/0004393 A1 | 1/2007 | Forsberg et al. |
| 2007/0054665 A1 | 3/2007 | Elkarat et al. |
| 2007/0066286 A1 | 3/2007 | Hurtta |
| 2007/0121501 A1 | 5/2007 | Bryson |
| 2007/0121812 A1 | 5/2007 | Strange et al. |
| 2007/0153995 A1 | 7/2007 | Fang et al. |
| 2007/0159976 A1 | 7/2007 | Dekeyzer et al. |
| 2007/0165599 A1 | 7/2007 | Skog et al. |
| 2007/0191006 A1 | 8/2007 | Carpenter |
| 2007/0195788 A1 | 8/2007 | Vasamsetti et al. |
| 2007/0232301 A1 | 10/2007 | Kueh |
| 2007/0259673 A1 | 11/2007 | Willars et al. |
| 2008/0021993 A1 | 1/2008 | Compton et al. |
| 2008/0046963 A1 | 2/2008 | Grayson et al. |
| 2008/0052258 A1 | 2/2008 | Wang et al. |
| 2008/0153484 A1 | 6/2008 | Boni et al. |
| 2008/0159194 A1 | 7/2008 | Westman et al. |
| 2008/0205345 A1 | 8/2008 | Sachs et al. |
| 2008/0232376 A1 | 9/2008 | Huang et al. |
| 2009/0061855 A1 | 3/2009 | Sethi et al. |
| 2009/0092107 A1 | 4/2009 | Cai et al. |
| 2009/0109845 A1 | 4/2009 | Andreasen et al. |
| 2009/0111458 A1 | 4/2009 | Fox et al. |
| 2009/0141625 A1 | 6/2009 | Ghai et al. |
| 2009/0177650 A1 | 7/2009 | Petersson et al. |
| 2009/0185494 A1 | 7/2009 | Li et al. |
| 2009/0207730 A1 | 8/2009 | Stamoulis et al. |
| 2009/0219946 A1 | 9/2009 | Liu et al. |
| 2009/0228956 A1 | 9/2009 | He et al. |
| 2009/0232019 A1 | 9/2009 | Gupta et al. |
| 2009/0270099 A1 | 10/2009 | Gallagher et al. |
| 2009/0325574 A1 | 12/2009 | Izawa et al. |
| 2010/0040047 A1 | 2/2010 | Zamora et al. |
| 2010/0048161 A1 | 2/2010 | He et al. |
| 2010/0080171 A1 | 4/2010 | Rune et al. |
| 2010/0091671 A1 | 4/2010 | Lidstrom et al. |
| 2010/0113015 A1 | 5/2010 | Casati et al. |
| 2010/0121960 A1 | 5/2010 | Baniel et al. |
| 2010/0142373 A1 | 6/2010 | Jin et al. |
| 2010/0188975 A1 | 7/2010 | Raleigh |
| 2010/0189004 A1 | 7/2010 | Mirandette et al. |
| 2010/0190497 A1 | 7/2010 | Pudney et al. |
| 2010/0192170 A1 * | 7/2010 | Raleigh ............ G06Q 10/06375 725/1 |
| 2010/0246500 A1 | 9/2010 | Rydnell et al. |
| 2010/0284278 A1 | 11/2010 | Alanara |
| 2010/0287121 A1 | 11/2010 | Li et al. |
| 2010/0290392 A1 | 11/2010 | Rasanen et al. |
| 2010/0291923 A1 | 11/2010 | Zhou et al. |
| 2010/0291924 A1 | 11/2010 | Antrim et al. |
| 2010/0299451 A1 | 11/2010 | Yigang et al. |
| 2010/0311670 A1 | 12/2010 | Stenfelt et al. |
| 2011/0035495 A1 | 2/2011 | Ekström et al. |
| 2011/0067085 A1 | 3/2011 | Brouard et al. |
| 2011/0076985 A1 | 3/2011 | Chami et al. |
| 2011/0096688 A1 | 4/2011 | Sachs et al. |
| 2011/0103261 A1 | 5/2011 | Duan |
| 2011/0116382 A1 | 5/2011 | McCann et al. |
| 2011/0122886 A1 | 5/2011 | Willars et al. |
| 2011/0138066 A1 | 6/2011 | Kopplin et al. |
| 2011/0158090 A1 | 6/2011 | Riley et al. |
| 2011/0165901 A1 | 7/2011 | Baniel et al. |
| 2011/0171958 A1 | 7/2011 | Hua et al. |
| 2011/0173332 A1 | 7/2011 | Li et al. |
| 2011/0188457 A1 | 8/2011 | Shu et al. |
| 2011/0199903 A1 | 8/2011 | Cuervo |
| 2011/0217979 A1 | 9/2011 | Nas |
| 2011/0219426 A1 | 9/2011 | Kim et al. |
| 2011/0225281 A1 | 9/2011 | Riley et al. |
| 2011/0225306 A1 | 9/2011 | Delsesto et al. |
| 2011/0230188 A1 | 9/2011 | Gemski |
| 2011/0252123 A1 | 10/2011 | Sridhar et al. |
| 2011/0264803 A1 | 10/2011 | Yuen et al. |
| 2011/0299395 A1 | 12/2011 | Mariblanca Nieves |
| 2011/0307790 A1 | 12/2011 | Pandya et al. |
| 2011/0314145 A1 | 12/2011 | Raleigh et al. |
| 2011/0317557 A1 | 12/2011 | Siddam et al. |
| 2011/0317571 A1 | 12/2011 | Kokkinen et al. |

(56) References Cited

U.S. PATENT DOCUMENTS

| | | |
|---|---|---|
| 2012/0008544 A1 | 1/2012 | Nakagawa et al. |
| 2012/0014332 A1 | 1/2012 | Smith et al. |
| 2012/0020260 A1 | 1/2012 | Chen et al. |
| 2012/0028626 A1 | 2/2012 | Marocchi et al. |
| 2012/0030331 A1* | 2/2012 | Karampatsis ....... H04L 41/0893 709/223 |
| 2012/0039175 A1 | 2/2012 | Sridhar et al. |
| 2012/0044867 A1 | 2/2012 | Faccin et al. |
| 2012/0052866 A1 | 3/2012 | Froehlich et al. |
| 2012/0057463 A1 | 3/2012 | Hurtta et al. |
| 2012/0064908 A1* | 3/2012 | Fox ...................... H04W 28/10 455/452.2 |
| 2012/0087368 A1 | 4/2012 | Kunarathnam et al. |
| 2012/0096177 A1 | 4/2012 | Rasanen |
| 2012/0099438 A1 | 4/2012 | Wang et al. |
| 2012/0099529 A1 | 4/2012 | Williams |
| 2012/0099715 A1 | 4/2012 | Ravishankar et al. |
| 2012/0100849 A1 | 4/2012 | Marsico |
| 2012/0115478 A1 | 5/2012 | Gunaratnam et al. |
| 2012/0131165 A1 | 5/2012 | Baniel et al. |
| 2012/0140632 A1 | 6/2012 | Norp et al. |
| 2012/0142311 A1 | 6/2012 | Rui et al. |
| 2012/0144226 A1 | 6/2012 | Yang et al. |
| 2012/0155298 A1 | 6/2012 | Yang et al. |
| 2012/0155389 A1 | 6/2012 | McNamee et al. |
| 2012/0176894 A1 | 7/2012 | Cai et al. |
| 2012/0188949 A1 | 7/2012 | Salkintzis et al. |
| 2012/0203781 A1 | 8/2012 | Wakefield |
| 2012/0210003 A1 | 8/2012 | Castro et al. |
| 2012/0213072 A1 | 8/2012 | Kotecha et al. |
| 2012/0215930 A1 | 8/2012 | Stenfelt et al. |
| 2012/0221445 A1 | 8/2012 | Sharma |
| 2012/0221693 A1 | 8/2012 | Cutler et al. |
| 2012/0236824 A1 | 9/2012 | McCann et al. |
| 2012/0250573 A1 | 10/2012 | Kulasingam et al. |
| 2012/0250613 A1 | 10/2012 | Robinson et al. |
| 2012/0257499 A1 | 10/2012 | Chatterjee et al. |
| 2012/0269134 A1 | 10/2012 | Jin et al. |
| 2012/0281617 A1 | 11/2012 | Bumiller |
| 2012/0281674 A1 | 11/2012 | Jackson et al. |
| 2012/0290452 A1 | 11/2012 | Pancorbo Marcos et al. |
| 2012/0303796 A1 | 11/2012 | Mo et al. |
| 2013/0039176 A1 | 2/2013 | Kanode et al. |
| 2013/0041994 A1 | 2/2013 | Terrien et al. |
| 2013/0044596 A1 | 2/2013 | Zhi et al. |
| 2013/0070594 A1 | 3/2013 | Garcia Martin et al. |
| 2013/0079006 A1 | 3/2013 | Cho et al. |
| 2013/0114404 A1 | 5/2013 | Yang |
| 2013/0142042 A1* | 6/2013 | Garcia Martin .... H04L 12/5692 370/230 |
| 2013/0160058 A1 | 6/2013 | Albal et al. |
| 2013/0163429 A1 | 6/2013 | Dunstan et al. |
| 2013/0177146 A1 | 7/2013 | Schneider et al. |
| 2013/0235736 A1 | 9/2013 | Khadri et al. |
| 2013/0250838 A1 | 9/2013 | Liang et al. |
| 2013/0265911 A1 | 10/2013 | Kulaingam et al. |
| 2013/0279401 A1 | 10/2013 | Sander et al. |
| 2014/0011512 A1 | 1/2014 | Hu et al. |
| 2014/0018067 A1 | 1/2014 | Rajagopalan et al. |
| 2014/0022897 A1 | 1/2014 | Rajagopalan et al. |
| 2014/0040975 A1 | 2/2014 | Raleigh et al. |
| 2014/0094159 A1* | 4/2014 | Raleigh ................ H04W 24/02 455/418 |
| 2015/0011182 A1 | 1/2015 | Goldner et al. |
| 2016/0359947 A1 | 12/2016 | Rao et al. |
| 2016/0371045 A1* | 12/2016 | Munn .................... G06F 3/1415 |
| 2016/0373589 A1 | 12/2016 | Chai |
| 2017/0019750 A1 | 1/2017 | Palanisamy et al. |
| 2017/0280270 A1 | 9/2017 | Kim et al. |
| 2017/0317904 A1 | 11/2017 | Rasanen |
| 2018/0288648 A1 | 10/2018 | Juneja |

FOREIGN PATENT DOCUMENTS

| | | |
|---|---|---|
| CN | 101217383 A | 7/2008 |
| CN | 101272534 A | 9/2008 |
| CN | 1849787 A | 10/2008 |
| CN | 101573933 A | 11/2009 |
| CN | 101841766 A | 9/2010 |
| CN | 101969635 A | 2/2011 |
| CN | 101978716 A1 | 2/2011 |
| CN | 102215469 A | 10/2011 |
| CN | 102223663 A | 10/2011 |
| CN | ZL200980130515.0 | 2/2015 |
| CN | ZL201080064945.X | 11/2015 |
| CN | ZL 201280020004.5 | 2/2017 |
| CN | ZL 201280022007.2 | 7/2017 |
| CN | ZL 201410643664.X | 12/2017 |
| CN | 104471974 B | 4/2018 |
| CN | ZL 201380037289.8 | 3/2019 |
| CN | ZL201380038255.0 | 5/2019 |
| EP | 0 857 399 B1 | 5/2004 |
| EP | 1 501 242 A2 | 1/2005 |
| EP | 1 551 144 A1 | 7/2005 |
| EP | 1 988 680 A1 | 11/2008 |
| EP | 2 088 723 A1 | 8/2009 |
| EP | 2 093 931 A1 | 8/2009 |
| EP | 2 403 186 A1 | 1/2012 |
| EP | 2 509 357 A1 | 10/2012 |
| EP | 2 555 562 A1 | 2/2013 |
| EP | 2 289 283 B1 | 2/2014 |
| EP | 2 520 045 B1 | 7/2015 |
| EP | 2 705 698 B1 | 4/2016 |
| EP | 2 875 662 B1 | 12/2017 |
| EP | 2 873 268 B1 | 1/2018 |
| EP | 2 873 256 B1 | 9/2018 |
| EP | 2 687 031 | 10/2018 |
| IN | 310801 | 4/2019 |
| JP | A-3-270398 | 12/1991 |
| JP | 10-023509 | 1/1998 |
| JP | 2000-125341 | 4/2000 |
| JP | 2001-054164 A | 2/2001 |
| JP | 2006-518972 A | 8/2006 |
| JP | 2007-282223 A | 10/2007 |
| JP | 2010-226470 | 10/2010 |
| JP | 2010-263604 A | 11/2010 |
| JP | 2011-029689 A | 2/2011 |
| JP | 2011-504311 A | 2/2011 |
| JP | 2012070107 A | 4/2012 |
| JP | 2012-531143 A | 12/2012 |
| JP | 2013540380 A | 10/2013 |
| JP | 6448536 B2 | 12/2018 |
| KR | 10-0497290 B1 | 6/2005 |
| WO | WO 2007/092573 A2 | 8/2007 |
| WO | WO 2008/000287 A1 | 1/2008 |
| WO | WO 2008/027660 A2 | 3/2008 |
| WO | WO 2008/133561 A1 | 11/2008 |
| WO | WO 2008/147933 A2 | 12/2008 |
| WO | WO 2009/039204 A2 | 3/2009 |
| WO | WO 2009/049684 A1 | 4/2009 |
| WO | WO 2009/058067 A1 | 5/2009 |
| WO | WO 2009/070179 A1 | 6/2009 |
| WO | WO 2009/082806 A1 | 7/2009 |
| WO | WO 2009/099256 A1 | 8/2009 |
| WO | WO 2009/127276 A1 | 10/2009 |
| WO | WO 2009/145785 A1 | 12/2009 |
| WO | WO 2009/149341 A2 | 12/2009 |
| WO | WO 2010/052030 A1 | 5/2010 |
| WO | WO 2010/055402 A1 | 5/2010 |
| WO | WO 2010/079715 A1 | 7/2010 |
| WO | WO 2010/080966 A1 | 7/2010 |
| WO | WO 2010/089884 A1 | 8/2010 |
| WO | WO 2010/139058 A1 | 12/2010 |
| WO | WO 2010/139360 A1 | 12/2010 |
| WO | WO 2011/082035 A2 | 7/2011 |
| WO | WO 2011/120229 A1 | 10/2011 |
| WO | WO 2011/134378 A1 | 11/2011 |
| WO | WO 2012/001221 A1 | 1/2012 |
| WO | WO 2012/077073 A1 | 6/2012 |
| WO | WO 2012/083795 A1 | 6/2012 |
| WO | WO 2012/129167 A1 | 9/2012 |

(56) References Cited

FOREIGN PATENT DOCUMENTS

| WO | WO 2012/154674 A2 | 11/2012 |
|---|---|---|
| WO | WO 2013/030659 A1 | 3/2013 |
| WO | WO 2014/014823 A1 | 1/2014 |
| WO | WO 2014/014829 A1 | 1/2014 |
| WO | WO 2018/183414 | 10/2018 |

OTHER PUBLICATIONS

Non-Final Office Action for U.S. Appl. No. 13/942,323 (dated Feb. 25, 2015).
Non-Final Office Action for U.S. Appl. No. 13/040,020 (dated Jan. 29, 2015).
Final Office Action for U.S. Appl. No. 13/572,156 (dated Dec. 29, 2014).
Advisory Action and Examiner-Initiated Interview Summary for U.S. Appl. No. 13/040,020 (dated Dec. 5, 2014).
Final Office Action for U.S. Appl. No. 13/040,020 (dated Sep. 19, 2014).
First Office Action for Chinese Application No. 201080064945.X (dated Sep. 17, 2014).
Non-Final Office Action for U.S. Appl. No. 13/572,132 (dated Aug. 11, 2014).
Non-Final Office Action for U.S. Appl. No. 13/572,156 (dated May 23, 2014).
Calhoun et al., "Diameter Base Protocol," RFC 3588, pp. 1-147 (Sep. 2003).
Advisory Action for U.S. Appl. No. 13/465,601 (dated Apr. 7, 2015).
Extended European Search Report for European Patent Application No. 12781800.3 (dated Mar. 23, 2015).
Extended European Search Report for European Patent Application No. 12760558.2 (dated Dec. 23, 2014).
Applicant-Initiated Interview Summary for U.S. Appl. No. 13/465,601 (dated Dec. 5, 2014).
Letter Regarding Notice of Grant for Japanese Patent Application No. 2013-558237 (Nov. 25, 2014).
Letter Regarding First Office Action for Japanese Patent Application No. 2014-509509 (dated Oct. 7, 2014).
Final Office Action for U.S. Appl. No. 13/465,601 (dated Oct. 7, 2014).
Notice of Allowance and Fee(s) Due for U.S. Appl. No. 13/423,991 (dated Aug. 15, 2014).
Office Action for Japanese Patent Application No. 2013-558237 (dated Jul. 29, 2014).
Applicant-Initiated Interview Summary for U.S. Appl. No. 13/465,601 (dated Jun. 18, 2014).
3GPP "3rd Generation Partnership Project; Technical Specification Group Services and System Aspects; Study on Support of BBF Access Interworking (Release 11)" 3GPP TS 23.839, V0.06.0, pp. 1-27 (Apr. 2011).
3rd Generation Partnership Project, "Technical Specification Group Services and System Aspects; Policy and charging control architecture (Release 11)," 3GPP TS 23.203, v11.1.0 pp. 1-136 (Mar. 2011).
Huawei, Hisilicon, "QoS Negotiation between BBF and 3GPP," 3GPP TSG SA WG2 Meeting #82, pp. 1-7 (Nov. 15-19, 2010).
China Mobile et al., "Policy Control Based on Network Status," 3GPP TSG SA WG2 Meeting #81 pp. 1-2 (Oct. 6, 2011).
Final Office Action for U.S. Appl. No. 13/040,020 (dated Dec. 13, 2013).
Notification of Transmittal of the International Search Report and the Written Opinion of the International Searching Authority, or the Declaration for International Application No. PCT/US2013/050512 (dated Dec. 2, 2013).
Notice of Allowance and Fee(s) Due for U.S. Appl. No. 13/330,086 (dated Nov. 6, 2013).

Notification of Transmittal of the International Search Report and the Written Opinion of the International Searching Authority, or the Declaration for International Application No. PCT/US2013/051447 (dated Oct. 28, 2013).
Non-Final Office Action for U.S. Appl. No. 12/973,228 (dated Oct. 25, 2013).
Notice of Allowance and Fee(s) Due for U.S. Appl. No. 13/276,916 (dated Sep. 3, 2013).
Non-Final Office Action for U.S. Appl. No. 13/040,020 (dated Jul. 18, 2013).
Commonly-assigned, co-pending International Applicaton No. PCT/US13/50512 for "Methods, Systems, and Computer Readable Media for Dynamically Controlling Congestion in a Radio Access Network," (Unpublished, filed Jul. 15, 2013).
Final Office Action for U.S. Appl. No. 12/973,228 (dated Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 13/276,916 (dated Apr. 11, 2013).
Non-Final Office Action for U.S. Appl. No. 12/973,228 (dated Feb. 1, 2013).
Communication of European Publication Number and Information on the Application of Article 67(3) EPC for European Patent Application No. 10841576.1 (dated Oct. 10, 2012).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Notification of Transmittal of the International Search Report and the Written Opinion of the International Searching Authority, or the Declaration for International Patent Application No. PCT/US2010/061586 (dated Sep. 26, 2011).
3GPP, "Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE+ePC=EPS), IMS, PCC and SDM," Effort, pp. 1-229 (Part 1 of 2) (May 2010).
Znaty, "Diameter, GPRS, (LTE+ePC=EPS), IMS, PCC and SDM," Efort pp. 230-461 (Part 2 of 2) (May 2010).

(56) References Cited

OTHER PUBLICATIONS

"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131.111 V8.3.0. pp. 1-102 (Oct. 2008).
Non-Final Office Action for U.S. Appl. No. 13/423,991 (dated Nov. 19, 2013).
Notification of Transmittal of the International Search Report and the Written Opinion of the International Searching Authority, or the Declaration for International Patent Application No. PCT/US2012/036784 (dated Nov. 1, 2012).
Notification of Transmittal of the International Search Report and the Written Opinion of the International Searching Authority, or the Declaration for International Patent Application No. PCT/US2012/029663 (dated Aug. 29, 2012).
3rd Generation Partnership Project, "Technical Specification Group Services and System Aspects; Policy and charging control architecture (Release 11)," 3GPP TS 23.203, v11.5.0 (Mar. 2012).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Third Generation Partnership Project, "Technical Specification Group Core Network and Terminals; Universal Subscriber Identity Module (USIM), Application Toolkit (USAT)," 3GPP TS 31.111, V10.0.0 (Oct. 2010).
Rao, "Mobile Broadband Evolution—LTE and EPC," Motorola General Business, LTE EPC IEEE ComSoC Boston (Apr. 8, 2010).
Third Generation Partnership Project, "Access Network Discovery and Selection Function (ANDSF) Management Object (MO)," 3GPP TS 24.312, V9.1.0 (Mar. 2010).
Third Generation Partnership Project, "Service requirements for the Evolved Packet System (EPS)," 3GPP TS 22.278, V10.1.0 (Mar. 2010).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401, V8.4.1 (Dec. 2008).
Third Generation Pertnership Project, "Technical Specification Group Services and System Aspects; 3GPP System Architecture Evolution: Report on Technical Options and Conclusions," 3GPP TR 23.882, V8.0.0 (Sep. 2008).
Third Generation Pertnership Project 2, "cdma2000 High Rate Packet Data Air Interface; Specification," 3GPP2 C.S0024-A, Version 3.0 (Sep. 2006).
Communication of extended European Search Report for European Patent Application No. 10841576.1 (dated May 9, 2014).
Applicant-Initiated Interview Summary for U.S. Appl. No. 13/423,991 (dated Mar. 26, 2014).
Notice of Allowance and Fee(s) Due for U.S. Appl. No. 12/973,228 (dated Mar. 20, 2014).
Non-Final Office Action for U.S. Appl. No. 13/465,601 (dated Mar. 7, 2014).
Communication of European Publication Number and Information on the Application of Article 67(3) EPC for European Patent Application No. 12781800.3 (dated Feb. 12, 2014).
Communication of European Publication Number and Information on the Application of Article 67(3) EPC for European Patent Application No. 12760558.2 (dated Jan. 7, 2014).
Non-Final Office Action for U.S. Appl. No. 13/040,020 (dated Apr. 21, 2014).
Applicant-Initiated Interview Summary for U.S. Appl. No. 13/040,020 (dated Mar. 20, 2014).
Applicant-Initiated Interview Summary for U.S. Appl. No. 13/572,132 (dated Mar. 1, 2016).
Extended European Search Report for European Application No. 13819665.4 (dated Feb. 12, 2016).
Extended European Search Report for European Application No. 13819435.2 (dated Feb. 9, 2016).
Notice of Allowance and Fee(s) Due for U.S. Appl. No. 13/942,323 (dated Feb. 5, 2016).
Extended European Search Report for European Application No. 13820508.3 (dated Feb. 3, 2016).
Applicant-Initiated Interview Summary for U.S. Appl. No. 13/942,205 (dated Jan. 22, 2016).
Non-Final Office Action for U.S. Appl. No. 13/572,132 (dated Nov. 27, 2015).
Advisory Action & AFCP 2.0 Decision for U.S. Appl. No. 13/942,323 (dated Oct. 5, 2015).
Non-Final Office Action for U.S. Appl. No. 13/942,205 (dated Sep. 14, 2015).
Letter Regarding Decision to Grant for Chinese Patent Application No. 201080064945.X (dated Sep. 1, 2015).
Advisory Action Before the Filing of an Appeal Brief and AFCP 2.0 Decision for U.S. Appl. No. 13/942,205 (dated Jul. 31, 2015).
Notice of Allowance and Fee(s) Due & Examiner-Initiated Interview Summary for U.S. Appl. No. 13/040,020 (dated Jul. 8, 2015).
"Policy on the Mobile: New Use Cases that Optimize Devices for the Network and Generate Revenue," An Oracle White Paper, pp. 1-15 (Dec. 2013).
Office Action for Canadian Application No. 2,730,103 (dated Apr. 16, 2015).
Letter Regarding Decision to grant a Chinese patent for Chinese Application No. ZL200980130515.0 (dated Dec. 2, 2014).
Notification of the Third Office Action for Chinese Application No. 200980130515.0 (dated Jun. 26, 2014).
Decision to grant a European patent pursuant to Article 97(1) EPC for European Application No. 09759499.8 (dated Jan. 23, 2014).
Second Office Action for Chinese Application No. 200980130515.0 (dated Dec. 10, 2013).
Communication Under Rule 71(3) EPC for European Patent Application No. 09759499.8 (dated Aug. 14, 2013).
Notice of Allowance and Fee(s) Due for U.S. Appl. No. 12/479,179 (dated Jul. 9, 2013).
Interview Summary for U.S. Appl. No. 12/479,179 (dated Jul. 1, 2013).
First Office Action for Chinese Patent Application No. 200980130515.0 (dated Apr. 24, 2013).
Final Office Action for U.S. Appl. No. 12/479,179 (dated Feb. 15, 2013).
Notice of Allowance and Fee(s) Due for U.S. Appl. No. 13/225,390 (dated Oct. 9, 2012).
Non-Final Official Action for U.S. Appl. No. 12/479,179 (dated Sep. 13, 2012).
European Search Report for European Patent Application No. EP 09 75 9499 (dated Sep. 12, 2012).
Applicant-Initiated Interview Summary for U.S. Appl. No. 13/225,390 (dated Aug. 13, 2012).
Non-Final Official Action for U.S. Appl. No. 13/225,390 (dated May 14, 2012).
Final Official Action for U.S. Appl. No. 12/479,179 (dated Apr. 10, 2012).
Non-Final Official Action for U.S. Appl. No. 12/479,179 (dated Aug. 2, 2011).
Restriction Requirement for U.S. Appl. No. 12/479,179 (dated Feb. 8, 2011).
Communication of European publication number and information on the application of Article 67(3) EPC for European Application No. 09759499.8 (dated Feb. 2, 2011).

(56) References Cited

OTHER PUBLICATIONS

Notification of Transmittal of the International Search Report and the Written Opinion of the International Searching Authority, or the Declaration for International Application No. PCT/US2009/046395 (dated Dec. 28, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (May 28, 2008).
Agilent Technologies, "Understanding DSLAM and BRAS Access Devices," White Paper, pp. 1-15 (2006).
"GPRS Tutorial," MorganDoyle Limited, pp. 1-13 (Publication Date Unknown).
Notice of Allowance and Fee(s) Due & Examiner-Initiated Interview Summary for U.S. Appl. No. 13/465,601 (dated Aug. 28, 2015).
Letter Regarding Issued Patent for Japanese Patent Application No. 2014-509509 (dated Aug. 5, 2015).
Applicant-Initiated InterviewSummary for U.S. Appl. No. 13/465,601 (dated Jul. 29, 2015).
Letter Regarding Notice of Grant for Japanese Patent Application No. 2014-509509 (dated Jun. 2, 2015).
Final Office Action for U.S. Appl. No. 13/942,323 (dated Jun. 9, 2015).
Advisory Action Before the Filing of Appeal Brief and AFCP 2.0 Decision for U.S. Appl. No. 13/572,132 (dated Jun. 4, 2015).
Final Office Action for U.S. Appl. No. 13/942,205 (dated May 19, 2015).
Communication under Rule 71(3) EPC for European Patent Application No. 10841576.1 (dated May 7, 2015).
Notification of the Second Office Action for Chinese Patent Application No. 201080064945.X (dated Apr. 22, 2015).
Communication of European Publication Number and Information on the Application of Article 67(3) EPC for European Patent Application No. 13819435.2 (dated Apr. 30, 2015).
Applicant-Initiated Interview Summary for U.S. Appl. No. 13/572,132 (dated Apr. 29, 2015).
Applicant-Initiated Interview Summary for U.S. Appl. No. 13/040,020 (dated Apr. 28, 2015).
Communication of European Publication Number and Information on the Application of Article 67(3) EPC for European Patent Application No. 13820508.3 (dated Apr. 22, 2015).
Communication of European Publication Number and Information on the Application of Article 67(3) EPC for European Application No. 13819665.4 (dated Apr. 22, 2015).
Notice of Allowance and Fee(s) Due and Interview Summary for U.S. Appl. No. 13/572,156 (dated Apr. 6, 2015).
Applicant-Initiated Interview Summary for U.S. Appl. No. 13/942,205 (dated Jan. 30, 2015).
Non-Final Office Action for U.S. Appl. No. 13/942,205 (dated Nov. 6, 2014).
Notification of Transmittal of the International Search Report and the Written Opinion of the International Searching Authority, or the Declaration for International Application No. PCT/US2013/050497 (dated Oct. 29, 2013).
Ye et al., "Enabling Local Breakout from eNB in LTE Networks," 2012 IEEE International Conference on Communications (ICC), pp. 6982-6986 (Jun. 10-15, 2012).

"3rd Generation Partnership Project; Technical Specification Group Services and System Aspects; Local IP Access and Selected IP Traffic Offload (LIPA-SIPTO) (Release 10)," 3GPP TR 23.829, pp. 1-43 (Oct. 2011).
Balbás et al., "Policy and Charging Control in the Evolved Packet System," LTE—3GPP Release 8, IEEE Communications Magazine, pp. 68-74 (Feb. 2009).
Non-Final Office Action for U.S. Appl. No. 13/465,601 (dated May 6, 2015).
Notification of the First Office Action for Chinese Application No. 201280022007.2 (dated May 5, 2016).
Decision to grant a European patent pursuant to Article 97(1) EPC for European Application No. 12781800.3 (dated Mar. 10, 2016).
Notification of the First Office Action for Chinese Application No. 201280020004.5 (dated Mar. 3, 2016).
Communication under Rule 71(3) EPC for European Application No. 12 781 800.3 (dated Jan. 7, 2016).
Final Office Action for U.S. Appl. No. 13/572,132 (dated Jun. 16, 2016).
Notice of Allowance and Fee(s) Due for U.S. Appl. No. 13/942,205 (dated May 16, 2016).
Office Action for Canadian Patent Application No. 2,730,103 (dated Apr. 8, 2016).
Advisory Action Before the Filing of an Appeal Brief for U.S. Appl. No. 13/572,132 (dated Sep. 22, 2016).
Final Office Action for U.S. Appl. No. 13/048,640 (dated Sep. 13, 2016).
Non-Final Office Action for U.S. Appl. No. 13/048,640 (dated Jan. 20, 2016).
Advisory Action and AFCP 2.0 Decision for U.S. Appl. No. 13/048,640 (dated Jul. 15, 2015).
Final Office Action for U.S. Appl. No. 13/048,640 (dated Apr. 10, 2015).
Non-Final Office Action for U.S. Appl. No. 13/048,640 (dated Oct. 6, 2014).
Advisory Action for U.S. Appl. No. 13/048,640 (dated Dec. 20, 2013).
Final Office Action for U.S. Appl. No. 13/048,640 (dated Oct. 8, 2013).
Non-Final Office Action for U.S. Appl. No. 13/048,640 (dated Mar. 15, 2013).
3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).
3GPP, "Policy and Charging Control Architecture," TS 23.203 version 8.4.0 Release 8 (Jan. 2009).
3rd Generation Partnership Project, "Technical Specification Group Services and System Aspects; Policy Charging Control Architecture," 3GPP TS 23.203, v. 8.1.1 (Mar. 2008).
International Standard, "Maritime Navigation and Radiocommunication Equipment and Systems—Digital Interfaces—Part 1: Single Talker and Multiple Listeners," IEC 61162-1, Second edition, pp. 1-86 (Jul. 2000).
Second Office Action for Chinese Patent Application No. 201280020004.5 (dated Aug. 17, 2016).
Advisory Action and After Final Consideration Program Decision fore U.S. Appl. No. 13/048,640 (dated Jan. 30, 2017).
Non-Final Office Action for U.S. Appl. No. 13/572,132 (dated Dec. 30, 2016).
Letter Regarding Decision to Grant Chinese Patent Application No. ZL20128002004.5 (dated Dec. 21, 2016).
Canadian Office Action for Canadian Patent Application No. 2,730,103 (dated Dec. 13, 2016).
Communication pursuant to Article 94(3) EPC for European Patent Application No. 13 820 508.3 (dated Nov. 9, 2016).
Letter Regarding Second Office Action for Chinese Patent Application No. 201280022007.2 (dated Jan. 4, 2017).
Notice of Allowance and Fee(s) Due for U.S. Appl. No. 13/572,132 (dated Aug. 22, 2017).
Notification of the First Office Action for Chinese Patent Application No. 201380037289.8 (dated Jul. 19, 2017).

(56) References Cited

OTHER PUBLICATIONS

Communicatiuon pursuant to Article 94(3) EPC for European Patent Application No. 13 819 665.4 (dated Jul. 5, 2017).
Letter Regarding Office Action for Japanese Patent Application No. 2015-521879 (dated Jun. 20, 2017).
Notification of the First Office Action for Chinese Patent Application No. 201410643664.X (dated May 4, 2017).
Applicant-Initiated Interview Summary for U.S. Appl. No. 13/572,132 (dated May 3, 2017).
Letter Regarding Office Action for Japanese Patent Application No. 2015-521880 (dated Mar. 21, 2017).
Letter Regarding Office Action for Japanese Patent Application No. 2015-523302 (dated Mar. 14, 2017).
Office Action for Indian Patent Application No. 9339/DELNP/2010 (dated Feb. 28, 2017).
Communication pursuant to Article 94(3) EPC for European Patent Application No. 13 820 508.3 (dated Feb. 9, 2017).
Tekelec et al., "Discussion paper on Usage-reporting from PCRF to OCS over Sy," 3GPP TSG SA WG2 #86, pp. 1-2 (Jul. 11-15, 2011).
Communication under Rule 71(3) EPC Intention to grant for European Patent Application No. 13 819 435.2 (dated Jul. 27, 2017).
Decision to Grant for Chinese Patent Application No. ZL201280022007.2 (dated May 16, 2017).
Notice of Allowance and Fee(s) Due and Examiner-Initiated Interview Summary for U.S. Appl. No. 13/048,640 (dated Oct. 5, 2017).
Letter Regarding Decision to grant a Chinese Patent for Chinese Patent Application No. ZL201410643664.X (dated Sep. 18, 2017).
Letter Regarding Japanese Office Action for Japanese Patent Application No. 2015-521880 (dated Sep. 12, 2017).
Communication under Rule 71(3) EPC for European Application No. 13 820 508.3 (dated Aug. 24, 2017).
Notification of the First Office Action for Chinese Application No. 201380037292.X (dated Aug. 18, 2017).
Notice of Grant for Japanese Patent Application Serial No. 2015-523302 (dated Nov. 6, 2018).
Office Action for Chinese Patent Application Serial No. 201380038255.0 (dated Oct. 25, 2018).
Notification to Grant for Chinese Patent Application Serial No. ZL201380037289.8 (dated Jan. 14, 2019).
Notice of Allowance for U.S. Appl. No. 15/472,211 (dated Oct. 17, 2018).
Hearing Notice for Indian Patent Application Serial No. 9339/DELNP/2010 (Jan. 28, 2019).
Decision to grant a European patent pursuant to Article 97(1) EPC for European Patent Application Serial No. 13819665.4 (dated Aug. 30, 2018).
Decision to grant a European patent pursuant to Article 97(1) EPC for European Patent Application Serial No. 12760558.2 (dated Sep. 20, 2018).
Communication pursuant to Article 94(3) EPC for European Patent Application Serial No. 12 760 558.2 (dated Nov. 2, 2017).
Office Action for Chinese Patent Application Serial No. 201380037289.8 (dated Jul. 31, 2018).
Notice of Allowance for Canadian Patent Application Serial No. 2,730,103 (dated Jul. 9, 2018).
Pre-Appeal Re-Examination Report and Official Notice for Japanese Patent Application Serial No. 2015-521879 (dated Jun. 28, 2018).

Notification of Transmittal of the International Search Report and the Written Opinion of the International Searching Authority, or the Declaration for International Application No. PCT/US2018/024713 (dated Jun. 18, 2018).
ZTE, "Error handling when the PCC rule is removed due to the S-GW restoration support," 3GPP TSG-CT WG3 Meeting #74bis, Release 12, pp. 1-3 (Oct. 11, 2013).
"3rd Generation Partnership Project; Technical Specification Group Core Network and Terminals; Study of Evolved Packet Core (EPC) nodes restoration (Release 11)," 3GPP TR 23.857, V11.0.0, pp. 1-66 (Dec. 2012).
Office Action for Japanese Patent Application Serial No. 2015-521880 (dated Nov. 27, 2018).
First Examination Report for Indian Patent Application Serial No. 8612/CHENP/2013 (dated Apr. 23, 2019).
First Examination Report for Indian Patent Application Serial No. 9418/CHENP/2014 (dated Apr. 29, 2019).
Office Action for Japanese Patent Application Serial No. 2015-521879 (dated Mar. 12, 2019).
Notification to Grant for Chinese Patent Application Serial No. ZL201380038255.0 (dated Mar. 22, 2019).
Notification of Grant for Japanese Patent Application Serial No. 2015-521880 (dated Mar. 19, 2019).
Letter Regarding Notification to Grant in Chinese Patent Application No. ZL201380037292.X (dated Feb. 13, 2018).
Notification of the Second Office Action for Chinese Patent Application No. 2013-80037289.8 (dated Feb. 8, 2018).
Pre-Appeal Re-Examination Report for Japanese Patent Application No. 2015-521880 (dated Jan. 16, 2018).
Letter Regarding Official Notice for Japanese Patent Application No. 2015-521880 (dated Jan. 23, 2018).
Decision to grant a European patent pursuant to Article 97(1) EPC for European Application No. 13820508.3 (dated Dec. 21, 2017).
Final Office Action for Japanese Patent Application No. 2015-521879 (dated Dec. 5, 2017).
Decision to grant a European patent pursuant to Article 97(1) EPC for European Application No. 13819435.2 (dated Nov. 30, 2017).
Office Action for Canadian Patent Application No. 2,730,103 (dated Nov. 28, 2017).
Second Office Action for Japanese Patent Application No. 2015-523302 (dated Oct. 24, 2017).
Notification of the First Office Action for Chinese Patent Application No. 201380038255.0 (dated Sep. 29, 2017).
Final Office Action for Japanese Patent Application No. 2015-523302 (dated May 22, 2018).
Communication under Rule 71(3) EPC for European Patent Application Serial No. 13 819 665.4 (dated Apr. 19, 2018).
Hearing Notice for Indian Patent Application Serial No. 6545/CHENP/2012 (dated Jul. 18, 2019).
Second Office Action for Chinese Application No. 201380038255.0 (dated May 25, 2018).
Communication under Rule 71(3) EPC for European Patent Application Serial No. 12 760 558.2 (dated May 7, 2018).
Notice of Concluding of Proceedings for Japanese Patent Application Serial No. 2015-521879 (dated Aug. 27, 2019).
First Examination Report for Indian Patent Application Serial No. 6545/CHENP/2012 (dated Sep. 28, 2018).

* cited by examiner

METHODS, SYSTEMS AND COMPUTER READABLE MEDIA FOR DISTRIBUTING POLICY RULES TO THE MOBILE EDGE

PRIORITY CLAIM

This application claims the benefit of U.S. Provisional Patent Application No. 61/674,270, filed on Jul. 20, 2012, the disclosure of which is incorporated herein by reference in its entirety.

TECHNICAL FIELD

The subject matter described herein relates to mobile device management and policy distribution. More particularly, the subject matter described herein relates to systems, methods, and computer readable media for distributing policy rules to the mobile edge.

BACKGROUND

In mobile broadband networks, as in other types of data networks, the access network is typically not cognizant of subscriber and user plans, tiers, and quotas. By the time signaling flows in the network are received by network elements that are subscriber-aware, application-aware, device-aware, quota-aware, and/or plan-aware, valuable resources in the access network infrastructure have been consumed. With the ongoing mobile broadband network growth, network operators have been increasingly motivated to both improve the average revenue per user (ARPU) from their spectrum holdings and address the deteriorating quality of experience (QoE) for all subscribers, irrespective of tiers or plans. One factor contributing to the QoE deterioration is the increasing amount of control signaling congestion generated by the proliferation of smart devices and smart device applications. Solutions attempting to address these challenges through access network infrastructure-based solutions fail to solve the problem. For example, over-provisioning the network by installing more cell towers, increasing backhaul capacity, or improving spectrum utilization via the deployment of small cells (e.g., picocells and femtocells) may be measures employed by networks. However, these access network based solutions only distribute the problem to smaller areas in the mobile network, rather than removing the problem of signaling congestion from the network.

Accordingly, there is a need for systems, methods, and computer readable media for distributing policy rules to the mobile edge.

SUMMARY

According to one aspect, the subject matter described herein includes methods, systems, and computer readable media for distributing policy rules from a data content network to user equipment in a mobile network are disclosed. In one embodiment, the method includes obtaining, by a mobile offload gateway (MOG) located in a core data content network, at least one mobile policy rule associated with a mobile subscriber. The method further includes transmitting, from the MOG, the at least one mobile policy rule to a user equipment (UE) located outside of the core data content network, wherein the UE is associated with the mobile subscriber and configuring the UE to function in accordance to the at least one mobile policy rule.

The subject matter described herein for distributing policy rules to the mobile edge may be implemented in hardware, software, firmware, or any combination thereof. As such, the terms "function", "module", or "node" as used herein refer to hardware, which may also include software and/or firmware components, for implementing the feature being described. In one exemplary implementation, the subject matter described herein may be implemented using a computer readable medium having stored thereon computer executable instructions that when executed by a hardware-based processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
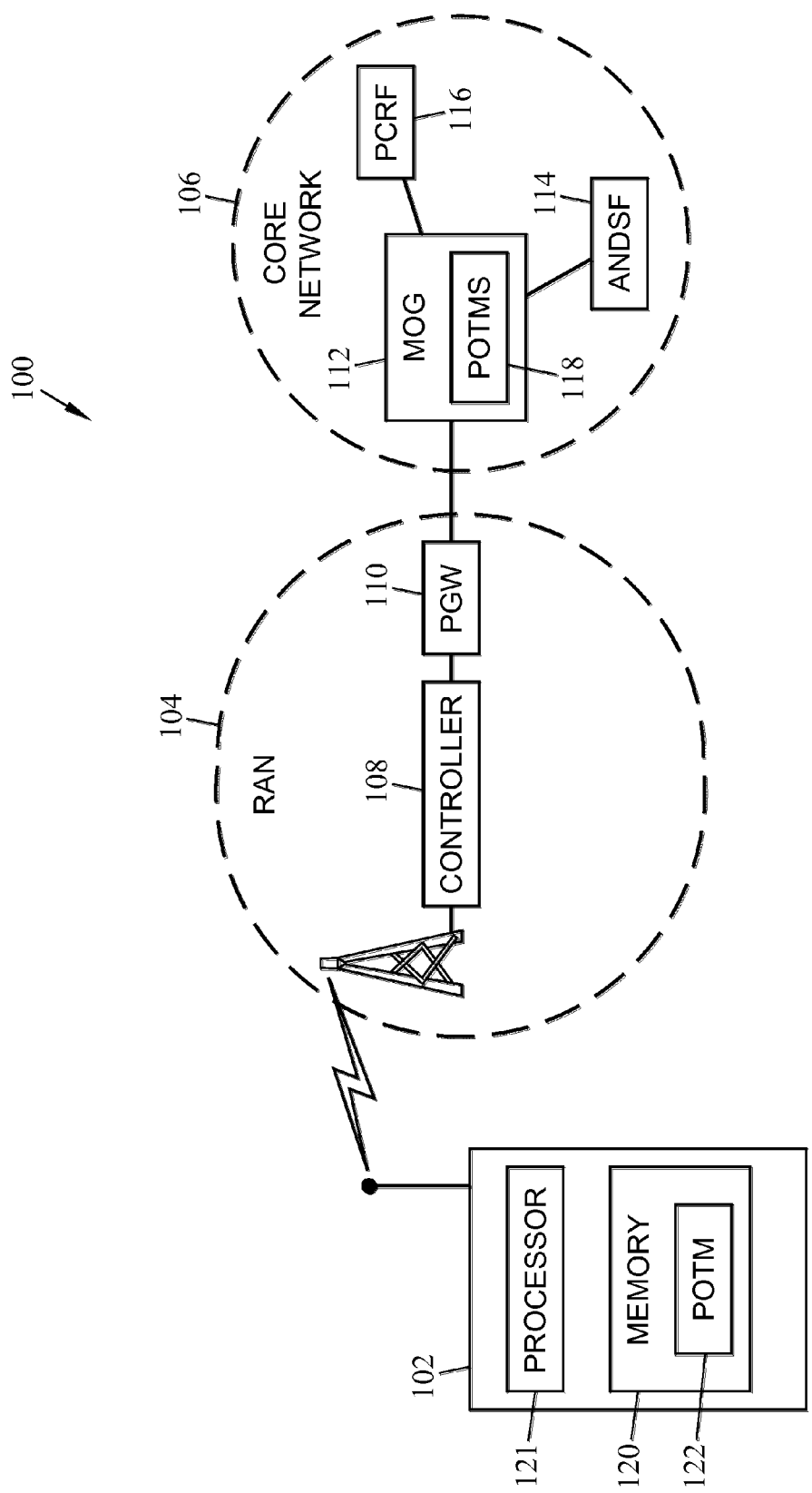
FIG. 1 is block diagram illustrating an exemplary system for distributing policy rules to the mobile edge according to an embodiment of the subject matter described herein.

The present subject matter introduces methods, systems, and computer readable media for distributing policy rules to the mobile edge. FIG. 1 depicts an exemplary system 100 that includes a user equipment (UE) device 102, a mobile network 104 (e.g., "mobile access network") and a core data content network 106 (e.g., "core network") that are communicatively connected. UE 102 may include any mobile device such as a mobile handset, a smart phone, a tablet, or other device that is capable of moving from one network type to another and is capable of attaching to networks of different types. In one embodiment, UE 102 may include a hardware based processor 121 and a memory component 120 configured to store policy rules, such as policies on the mobile (POTM) 122.

Mobile network 104 may comprise any type of mobile or cellular based network that is capable of providing UE 102 access to a core network (e.g., core network 106). In one embodiment, mobile network 104 may include a 3GPP radio access network (RAN), a 3G RAN, a 4G RAN, a long term evolution (LTE) RAN, or the like. Mobile network 104 may be communicatively connected to UE 102. For example, a wireless airlink may be established between UE 102, which may be located near or in mobile network 104, and a cell tower positioned in mobile network 104. Notably, all communications (e.g., signaling path and bearer/data content path) made between UE 102 and mobile network 104 is conducted via the air link. Mobile network 104 may include a controller unit 108, such as a base station controller (BSC), a radio network controller, a Node B, or an evolved Node B (eNode B), that is attached or incorporated within a base station or cell tower. Controller unit 108 may also be connected to a packet gateway (PGW) 110, which may include any component of the wireless network that provides service to subscribers present in the mobile network 104. In one embodiment, PGW 110 may be an LTE network component that provides services to UEs that are not in range of a Wi-Fi network and/or are not utilizing a Wi-Fi network. PGW 110 may also be configured to communicatively connect mobile network 104 and core network 106.

Core data content network 106 may include a mobility offload gateway (MOG) 112, an access network discovery and selection function (ANDSF) node 114, and a policy and charging rules function (PCRF) node 116. In one embodiment, MOG 112 is the network element belonging to the network policy infrastructure that instructs other nodes in the network on policies to implement for UEs and related sessions. For example, MOG 112 may be a standalone node, such as a mobile policy gateway (MPG), that is part of the policy infrastructure and is configured to manage the policy offload process from core network 106 (e.g., a 3GPP network) to UE 102. MOG 112 is further configured to connect to a policy server, such as PCRF node 116. MOG 112 may also be responsible for informing UE 102 of local WiFi networks (e.g., an existing Wi-Fi network provided to public users, such as at an airport, store, restaurant, or the like) as well as providing UE 102 with secure credentials to connect to a local WiFi network. In one embodiment, MOG 112 may be integrated with another node that is part of the infrastructure (e.g., integrated with PCRF node 116).

In one embodiment, PCRF node 116 may be configured to store network policy rules (or "policies") and to respond to queries from other nodes to provide such policy rules. For example, PCRF node 116 may be configured to generate and provide one or more mobile policy rules, such as a "policy on the mobile" (POTM), to MOG 112. In another embodiment, PCRF node 116 may receive a query from MOG 112 requesting at least one mobile policy rule. MOG 112 may store the policy rules provided by PCRF node 116 in a POTM database or memory (as shown in FIG. 1 as POTMS 118). MOG 112 may also be connected (or integrated) with ANDSF node 114 which is responsible for helping UE 102 discover non-3GPP access networks (e.g., Wi-Fi or WiMax access networks). ANDSF node 114 may also be configured to provide policy rules regarding access network connection to UE 102.

The present subject matter pertains to the offloading of a set of policy rules to the user equipment that enables a network operator to control the functional behavior of UE 102. Such policy based rules may include battery usage policy rules, radio access network airlink measurement policy rules, data network throttling policy rules, a tier-based subscription policy rules, signaling control policy rules, user data quota policy rule, and the like on UE 102.

In some embodiments, the provisioned policy rules are configured to prevent UE 102 from unnecessarily communicating and/or connecting to core network 106 via the mobile network 104 under a specified circumstance. Thus, network level resource usage and capacity can be preserved for the operator-managed services that may include subscriber sensitivity. For example, a network operator may offload a policy rule to the UE of a bronze tier subscriber that instructs the UE to switch off the mobile data interface during specific periods of time (e.g., during "peak" or "busy" hours). In addition, the offloaded policy rule may or may not allow UE 102 to turn on the Wi-Fi interface during the designated time period. Other offloaded policy rules may prevent the UE from accessing the data network for data intensive applications, such as over the top (OTT) video streaming applications. Moreover, network intelligence at the operator core may be used to direct the dynamic policy rules that are already provisioned on the UE. One such example is the use of application throttling policy rules on the UE during the times the core operator network experiences congestion (e.g., during busy hours). Note that these policy rules can be installed either when UE 102 is directly connected to the core network 106 or when UE 102 is connected to core network 106 via an access network (e.g., RAN 104) or via some other access technology, such as WiMax or WiFi.

Figure 2:
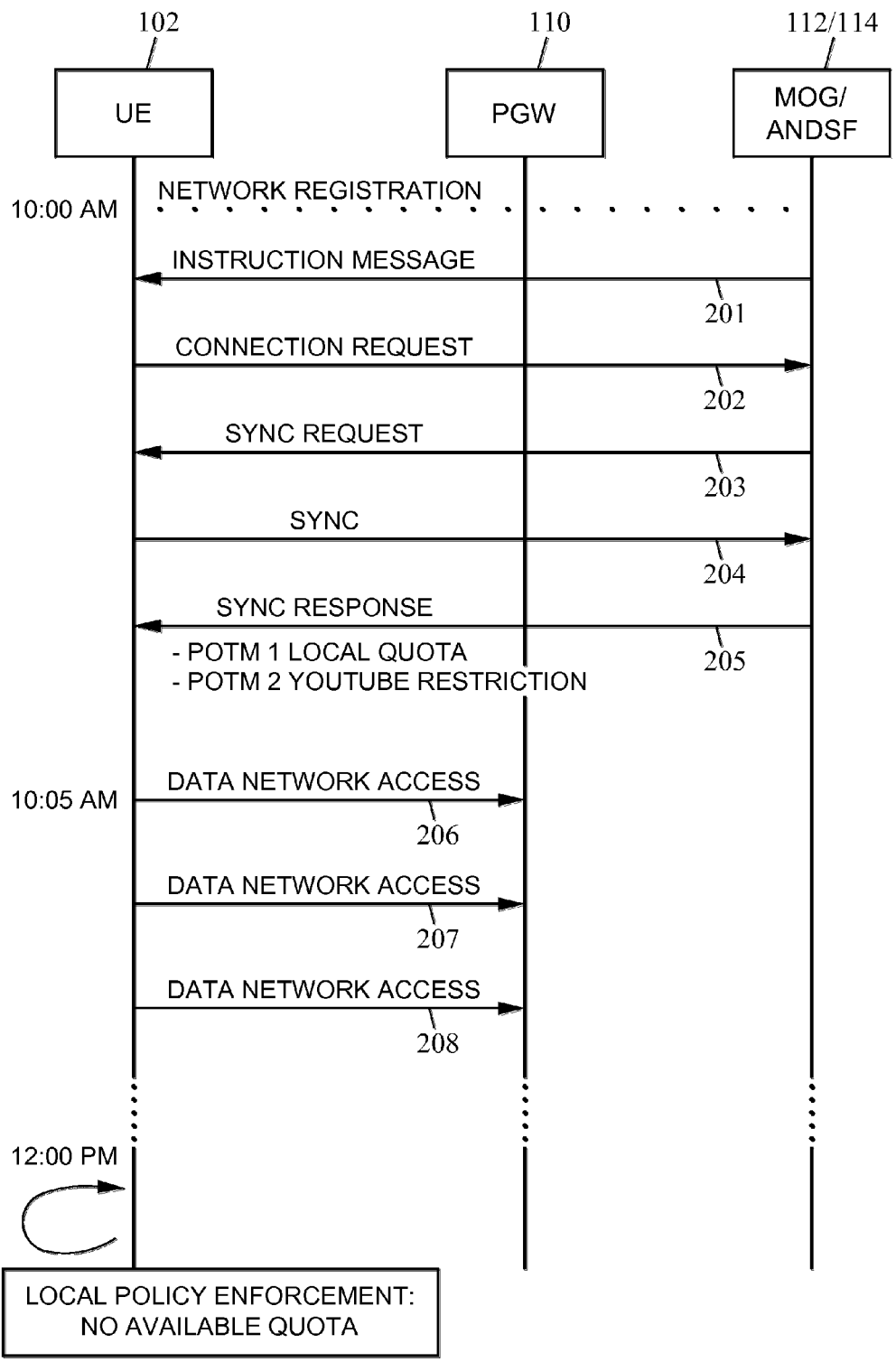
FIG. 2 is a call flow diagram illustrating the distribution of a first set of policy rules to the mobile edge according to an embodiment of the subject matter described herein.
Figure 3:
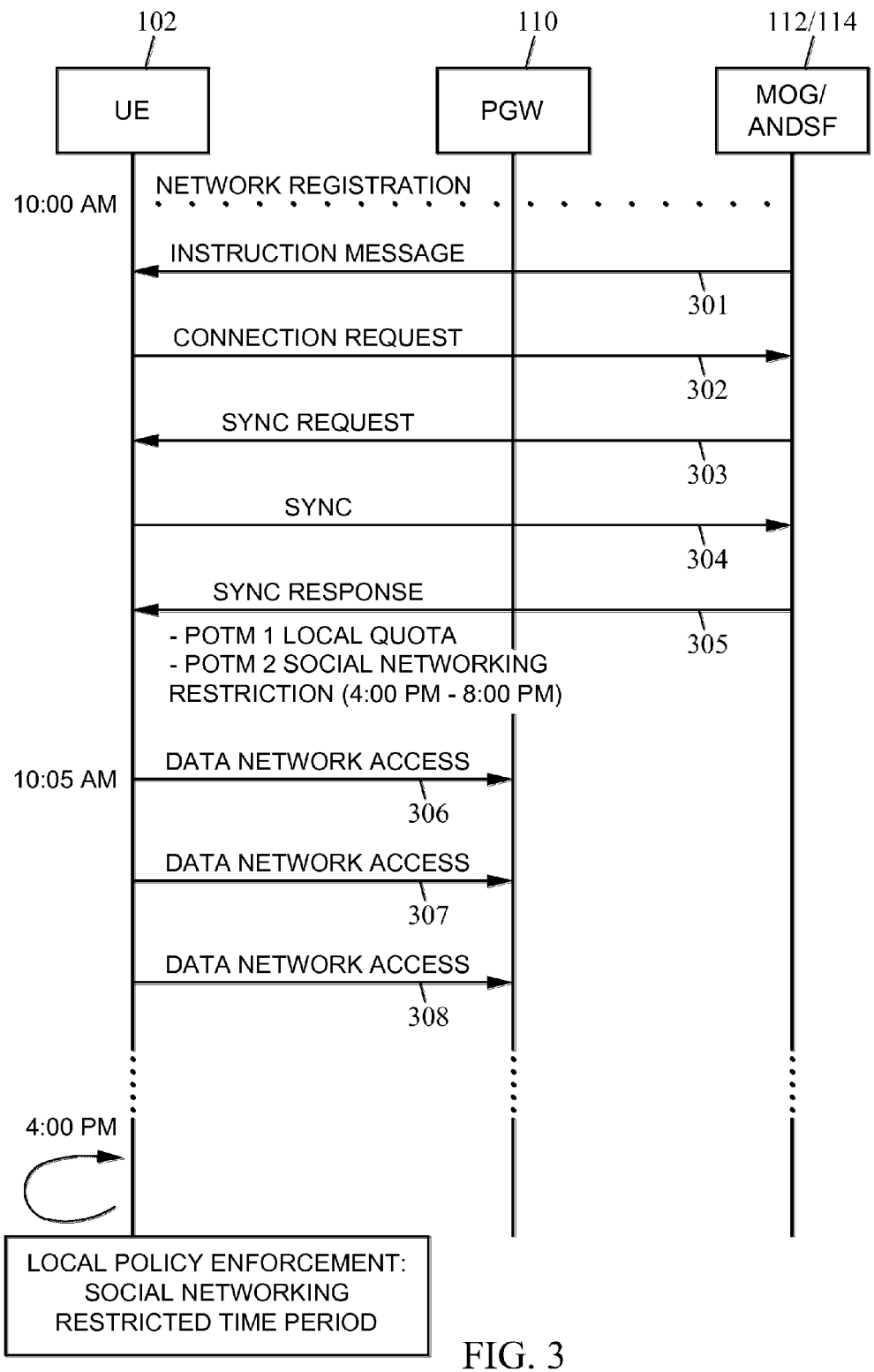
FIG. 3 is a call flow diagram illustrating the distribution of a second set of policy rules to the mobile edge according to an embodiment of the subject matter described herein.

Exemplary call flows illustrating the provisioning of local policy rules that instruct the UE to offload to a WiFi network are shown in FIG. 2 and FIG. 3. For example, FIG. 2 depicts UE 102 and MOG 112 conducting a network registration procedure. MOG 112 may initiate the registration procedure by sending an instruction message 201 to UE 102. Notably, instruction message 201 may include a signaling message that instructs UE 102 to initiate a connection to MOG 112. In response, UE 102 may send a connection response message 202 to MOG 112 to establish a connection. In another embodiment, UE 102 may request and/or initiate a connection to MOG 112 on its own (i.e., without receiving instruction message 201). After UE 102 and MOG 112 are communicatively connected, MOG 112 may send a synchronization request message 203 to UE 102, which in turn responds with a synchronization signaling message 204.

After the exchange of signaling messages 203-204, MOG 112 sends a synchronization response message 205 that contains at least one mobile policy rule or POTM. In FIG. 2, message 205 contains two POTMs that include i) a local quota enforcement policy rule and ii) a "YouTube" time-based restriction policy rule. For example, the local quota enforcement policy rule may comprise a policy rule that limits UE 102 from downloading data content in excess of 5 GB per day. Similarly, the YouTube restriction policy rule may instruct UE 102 not to download and/or access YouTube via the 3GPP data access network at any time between 4:00 PM and 8:00 PM (e.g., "busy/peak hours"). After the mobile policy rules (e.g., POTMs 122) are locally provisioned (e.g., the POTMs are loaded and/or installed) in memory 120 of UE 102, UE 102 may then be configured to function in accordance to the mobile policy rule(s).

In FIG. 2, UE 102 subsequently accesses the data network via PGW 110. FIG. 2 also indicates that at 12:00 PM, the subscriber's daily quota has been depleted and the associated local policy is triggered such that 3GPP data access is throttled, adjusted, and/or ceased. As a result, no signaling generated by UE 102 is sent via the 3GPP data network. Thus, only WLAN access, if available, may be accessed by UE 102.

In FIG. 3, UE 102 and MOG 112 are depicted as conducting a network registration procedure. In one embodiment, MOG 112 may send an instruction message 301 to UE 102. Notably, instruction message 301 may include a signaling message that instructs UE 102 to initiate a connection to MOG 112. In response, UE 102 may send a connection response message 302 to MOG 112 to establish a connection. In another embodiment, UE 102 may request and/or initiate a connection to MOG 112 on its own (e.g., without receiving instruction message 301). After UE 102 and MOG 112 are communicatively connected, MOG 112 may send a synchronization request message 303 to UE 102, which in turn responds with a synchronization signaling message 304.

After the exchange of signaling messages 303-304, MOG 112 sends a synchronization response message 305 that contains at least one mobile POTM. In FIG. 3, the POTMs in message 305 include i) a local quota enforcement policy rule and ii) a social networking restriction policy rule. For example, the local quota enforcement policy rule may comprise a policy rule that limits UE 102 from downloading data content in excess of 5 GB per day. Similarly, the social networking restriction policy rule may prevent UE 102 from performing or accessing any social networking site via the 3 GPP data access network at any time between the hours of 4:00 PM and 8:00 PM (e.g., "peak/busy hours"). Notably, UE 102 may also be prevented from issuing any signaling messages related to any social networking applications. After the mobile policy rules (e.g., POTMs 122) are locally provisioned (e.g., the POTMs are loaded/installed) in memory 120 of UE 102, UE 102 may then be configured to function in accordance to the mobile policy rule(s).

In FIG. 3, UE 102 subsequently accesses the data network via PGW 110. FIG. 3 also indicates that at 4:00 PM, the policy rule responsible for preventing the subscriber from accessing social networking applications/websites is triggered. Therefore, all signaling related to social networking that is generated by UE 102 is throttled, adjusted, and/or ceased. As a result, no signaling message generated by UE 102 is sent to social networking applications via the 3GPP data network. Thus, social networking applications may only be accessed by UE 102 via WLAN access, if available and/or possible.

The present subject matter addresses problems that arise when the UE is unable to connect to the WiFi network. More specifically, the proposed subject matter defines the behavior of UE 102 when offload to a WiFi or WiMax network is not possible. One significant contribution of the present subject matter, however, is the fact that important UE measurements pertinent to QoE may be measured via a core network interface. The core network operator may then use this UE measurement information to perform network optimization. Until now, UE performance/QoE has been the domain of the access network, and not accessible by the core network, which enforces policy and the use of network resources. The present subject matter will also enable network operators to perform network optimization in a manner consistent with service level agreements (SLAs).

It will be understood that various details of the subject matter described herein may be changed without departing from the scope of the subject matter described herein. Furthermore, the foregoing description is for the purpose of illustration only, and not for the purpose of limitation.

What is claimed is:

1. A method for distributing policy rules from a core data content network to user equipment in a mobile network, the method comprising:

obtaining, by a mobile offload gateway (MOG) located in a core data content network, at least one mobile policy rule associated with a mobile subscriber, wherein the mobile subscriber is associated with a user equipment (UE) located outside of the core data content network, wherein obtaining the at least one mobile policy rule includes sending a query to a policy and charging rules function (PCRF) node to request the at least one mobile policy rule and receiving the at least one mobile policy rule from the PCRF node;

transmitting, from the MOG, an instruction message to the UE that instructs the UE to initiate a connection with the MOG;

receiving, at the MOG, a connection request from the UE in response to the received instruction message;

transmitting, from the MOG, a synchronization message containing the at least one mobile policy rule to the UE after the connection is established, wherein the at least one mobile policy rule transmitted by the MOG includes a policy rule that throttles or ceases the UE's signaling to an access network that is separate from the core data content network; and configuring the UE to function in accordance with the at least one mobile policy rule, wherein the at least one mobile policy rule includes a time-based restriction policy rule that prevents the UE from communicating signaling messages to a designated website via the access network during a specified time period.

2. The method of claim 1 wherein the at least one mobile policy rule restricts signaling messages generated by and transmitted from the UE to the core data content network.

3. The method of claim 1 wherein the at least one mobile policy rule includes at least one of: a battery usage policy rule, a radio access network airlink measurement policy rule, a data network throttling policy rule, a tier-based subscription policy rule, a signaling control policy rule, and a user data quota policy rule.

4. The method of claim 3 wherein the data network throttling policy rules include policy rules for reducing or ceasing data content traffic from the core data content network to the UE.

5. The method of claim 1 wherein the UE is located in a mobile network.

6. The method of claim 5 wherein the mobile network includes a 3GPP radio access network (RAN), a 3G RAN, a 4G RAN, or a long term evolution (LTE) RAN.

7. The method of claim 1 wherein the MOG includes a mobile policy gateway (MPG).

8. The method of claim 1 wherein obtaining at least one mobile policy rule includes querying a policy and charging rules function (PCRF) node for the at least one mobile policy rule.

9. A system for distributing policy rules from a data content network to user equipment in a mobile network, the system comprising:

a mobile offload gateway (MOG) configured to obtain at least one mobile policy rule associated with a subscriber and transmitting, from the MOG, the at least one mobile policy rule, wherein the MOG is located in a data content network and configured to send a query to a policy and charging rules function (PCRF) to request the at least one mobile policy rule and to receive the at least one mobile policy rule from the PCRF node; and a user equipment (UE) configured to receive the at least one mobile policy rule and configured to function in accordance with the at least one mobile policy rule, wherein the UE is located in mobile network, wherein the MOG is configured to send an instruction message to the UE that instructs the UE to initiate a connection with the MOG and to subsequently provide the at least one policy rule in a synchronization message sent to the UE after the connection is established, wherein the at least one mobile policy rule transmitted by the MOG includes a policy rule that throttles or ceases the UE's signaling to an access network that is separate from the core data content network, wherein the at least one mobile policy rule includes a time-based restriction policy rule that prevents the UE from communicating signaling messages to a designated website via the access network during a specified time period.

10. The system of claim 9 wherein the at least one mobile policy rule restricts signaling messages generated by and transmitted from the UE to the core data content network.

11. The system of claim 9 wherein the at least one mobile policy rule includes at least one of: a battery usage policy rule, a radio access network airlink measurement policy rule, a data network throttling policy rule, a tier-based subscription policy rule, a signaling control policy rule, and a user data quota policy rule.

12. The system of claim 11 wherein the data network throttling policy rules include policy rules for reducing or ceasing data content traffic from the core data content network to the UE.

13. The system of claim 9 wherein the UE is located in a mobile network.

14. The system of claim 13 wherein the mobile network includes a 3GPP radio access network (RAN), a 3G RAN, a 4G RAN, or a long term evolution (LTE) RAN.

15. The system of claim 10 wherein the MOG includes a mobile policy gateway (MPG).

16. The system of claim 9 wherein the MOG is configured to query a policy and charging rules function (PCRF) node for the at least one mobile policy rule.

17. A non-transitory computer readable medium having stored thereon executable instructions that when executed by the processor of a computer control the computer to perform steps comprising:

obtaining, by a mobile offload gateway (MOG) located in a core data content network, at least one mobile policy rule associated with a mobile subscriber, wherein the mobile subscriber is associated with a user equipment (UE) located outside of the core data content network, wherein obtaining the at least one mobile policy rule includes sending a query to a policy and charging rules function (PCRF) node to request the at least one mobile policy rule and receiving the at least one mobile policy rule from the PCRF node;

transmitting, from the MOG, an instruction message to the UE that instructs the UE to initiate a connection with the MOG;

receiving, at the MOG, a connection request from the UE in response to the received instruction message;

transmitting, from the MOG, a synchronization message containing the at least one mobile policy rule to the UE after the connection is established, wherein the at least one mobile policy rule transmitted by the MOG includes a policy rule that throttles or ceases the UE's signaling to an access network that is separate from the core data content network; and configuring the UE to function in accordance with the at least one mobile policy rule, wherein the at least one mobile policy rule includes a time-based restriction policy rule that prevents the UE from communicating signaling messages to a designated website via the access network during a specified time period.

* * * * *